United States Patent
Dupey et al.

(10) Patent No.: US 10,311,155 B2
(45) Date of Patent: Jun. 4, 2019

(54) DYNAMIC MASTER RECORD SELECTION

(71) Applicant: SAP SE, Walldorf (DE)

(72) Inventors: Ronald Dupey, West Salem, WI (US); Jeffrey Woody, Onalaska, WI (US); Prasanthi Thatavarthy, Onalaska, WI (US); Ryan Champlin, La Crosse, WI (US); Chad Taylor, Holmen, WI (US)

(73) Assignee: SAP SE, Walldorf (DE)

( * ) Notice: Subject to any disclaimer, the term of this patent is extended or adjusted under 35 U.S.C. 154(b) by 714 days.

(21) Appl. No.: 14/867,450

(22) Filed: Sep. 28, 2015

(65) Prior Publication Data

US 2017/0091230 A1   Mar. 30, 2017

(51) Int. Cl.
*G06F 17/30* (2006.01)
(52) U.S. Cl.
CPC .............................. *G06F 17/30303* (2013.01)
(58) Field of Classification Search
CPC .................................................. G06F 17/30303
See application file for complete search history.

(56) References Cited

U.S. PATENT DOCUMENTS

| | | | | |
|---|---|---|---|---|
| 7,761,920 B2* | 7/2010 | Bezilla | .................. | G06F 21/552 726/1 |
| 8,997,232 B2* | 3/2015 | Be'ery | .................... | H04L 63/14 380/229 |
| 9,075,858 B2* | 7/2015 | Andre | ................ | G06F 17/30584 |
| 9,529,846 B2* | 12/2016 | Wu | .................... | G06F 17/30545 |
| 9,710,495 B2* | 7/2017 | Nguyen | ............ | G06F 17/30289 |
| 9,824,236 B2* | 11/2017 | Lynch | ................ | G06F 17/30598 |
| 2015/0006491 A1* | 1/2015 | He | .................... | G06F 17/30575 707/694 |

* cited by examiner

*Primary Examiner* — Debbie M Le
(74) *Attorney, Agent, or Firm* — Buckley, Maschoff & Talwalkar LLC

(57) ABSTRACT

A system includes identification of a group of records of a plurality of records of a database table associated with a plurality of columns, each of the plurality of records including zero or one value for each column, determination of a plurality of rules, each rule associated with one or more of the plurality of columns and for determining a record from which to select values for the associated one or more columns, evaluation of each of the plurality of rules to determine, for each rule, a record of the group of records, and determination of a first record of the group of records based on the record determined for each rule.

15 Claims, 10 Drawing Sheets

| Row_ID | Group_ID | Name | ID_Num | Update_Date | System | House_Num | Street | Street_Suppl | City | Country | Description |
|---|---|---|---|---|---|---|---|---|---|---|---|
| 1 | 1 | Jill | 01 | 20140907 | ERP2 | 200 | Oak | Ave | Chicago | US | |
| 2 | 1 | Jill | | 20140907 | ERP1 | 110 | Elm | St | Chicago | US | |
| 3 | 1 | Jillian | 3333-3333 | 20130801 | ERP2 | 200 | Oak | Ave | Chicago | USA | |
| 4 | 1 | Jill | 1111-1111 | 20130801 | ERP2 | 304 | Park | Ave | | US | Some Description |

FIG. 2

| Row_ID | Group_ID | Name | ID_Num | Update_Date | System | House_Num | Street | Street_Suppl | City | Country | Description |
|---|---|---|---|---|---|---|---|---|---|---|---|
| 1 | 1 | Jill | 01 | 20140907 | ERP2 | 200 | Oak | Ave | Chicago | US | |
| 2 | 1 | Jill | | 20140907 | ERP1 | 110 | Elm | St | Chicago | US | |
| 3 | 1 | Jillian | 3333-3333 | 20130801 | ERP2 | 200 | Oak | Ave | Chicago | USA | |
| 4 | 1 | Jill | 1111-1111 | 20130801 | ERP2 | 110 | Oak | Ave | Chicago | US | Some Description |

*FIG. 4*

| Row_ID | Group_ID | Name | ID_Num | Update_Date | System | House_Num | Street | Street_Suppl | City | Country | Description |
|---|---|---|---|---|---|---|---|---|---|---|---|
| 1 | 1 | Jill | 01 | 20140907 | ERP2 | 200 | Oak | Ave | Chicago | US | |
| 2 | 1 | *Jill* | *1111-1111* | *20140907* | *ERP1* | *110* | *Elm* | *St* | *Chicago* | *US* | *Some Description* |
| 3 | 1 | Jillian | 3333-3333 | 20130801 | ERP2 | 200 | Oak | Ave | Chicago | USA | |
| 4 | 1 | Jill | 1111-1111 | 20130801 | ERP2 | 304 | Park | Ave | | US | Some Description |

*FIG. 6*

Best Record Determination — 800

Group 1 — 810

| | Name | Address | City | Country | Description | Updated | System |
|---|---|---|---|---|---|---|---|
| ☐ | Jill | 200 Oak Ave | Chicago | US | | 20140907 | ERP2 |
| ☒ | Jill | 110 Elm St | Chicago | US | | 20140907 | ERP1 |
| ☐ | Jillian | 200 Oak Ave | Chicago | USA | | 20130801 | ERP2 |
| ☐ | Jill | 304 Park Ave | | US | Some Description | 20130801 | ERP2 |

820 points to checkbox column; 812, 814, 816, 818 label the rows.

*FIG. 8*

Best Record Determination ⟵ 800

Group 1

820 ⟶ ⟵ 810

| | Name | Address | City | Country | Description | Updated | System |
|---|---|---|---|---|---|---|---|
| ☐ | Jill | 200 Oak Ave | Chicago | US | | 20140907 | ERP2 |
| ☒ | Jill | 110 Elm St | Chicago | US | *Some Description* | 20140907 | ERP1 |
| ☐ | Jillian | 200 Oak Ave | Chicago | USA | | 20130801 | ERP2 |
| ☐ | Jill | 304 Park Ave | | US | Some Description | 20130801 | ERP2 |

DYNAMIC MASTER RECORD SELECTION

BACKGROUND

Enterprise database systems store vast amounts of data received from one or more different sources. This data is typically stored in the form of relational database table records. Since the data may be received from different sources and/or at different times, a database table may include several records representing a same object. For example, a table storing personal addresses may include several records associated with a same person, depending upon the source or reception time of the address information stored therein. Such records may be considered duplicate records.

Once duplicate records are identified, it may be desirable to consolidate the duplicate records into a single master record. This requires selection of a master record of the duplicate records, into which the "best" column values identified from the duplicate records will be stored.

Some systems support rules for selecting a master record in which priorities for input sources are configured and one or more priority fields are chained together. In other systems, the first record of each group of duplicate records is simply chosen as the master record. Both approaches present difficulties and inefficiencies which hamper the selection of a master record which is appropriate in view of a user's needs.

BRIEF DESCRIPTION OF THE DRAWINGS

FIG. 2 is a tabular representation of a database table according to some embodiments.

FIG. 4 is a tabular representation of a database table according to some embodiments.

FIG. 6 is a tabular representation of a database table according to some embodiments.

FIG. 8 is an outward view of a user interface according to some embodiments.

FIG. 9 is an outward view of a user interface according to some embodiments.

DETAILED DESCRIPTION

The following description is provided to enable any person in the art to make and use the described embodiments. Various modifications, however, will remain readily apparent to those in the art.

Figure 1:
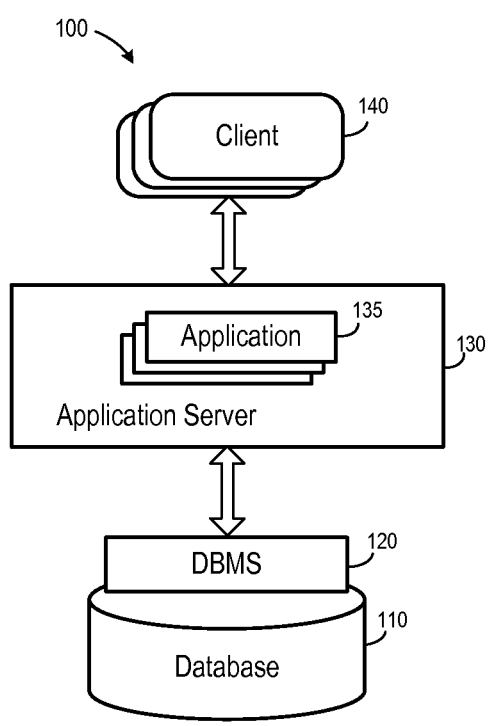
FIG. 1 is a block diagram of a database architecture according to some embodiments.

FIG. 1 is a block diagram of database architecture 100 according to some embodiments. Embodiments are not limited to architecture 100 or to a database architecture.

Architecture 100 includes database 110, database management system (DBMS) 120, application server 130, applications 135 and clients 140. Generally, applications 135 executing within application server 130 receive queries from clients 140 and provides results to clients 140 based on data of database 110. Applications 135 executing within application server 130 may also provide administrative functions to clients 140, including but not limited to master record selection and best record consolidation as will be described below.

Application server 130 executes and provides services to applications 135. Applications 135 may comprise server-side executable program code (e.g., compiled code, scripts, etc.) which provide functionality to clients 140 by providing user interfaces to clients 140, receiving requests from clients 140, retrieving data from database 110 based on the requests, processing the data received from database 110, and providing the processed data to clients 140. Applications 135 may be made available for execution by application server 130 via registration and/or other procedures which are known in the art.

Application server 130 provides any suitable interfaces through which clients 140 may communicate with applications 135 executing on application server 130. For example, application server 130 may include a HyperText Transfer Protocol (HTTP) interface supporting a transient request/response protocol over Transmission Control Protocol (TCP), a WebSocket interface supporting non-transient full-duplex communications between application server 130 and any clients 140 which implement the WebSocket protocol over a single TCP connection, and/or an Open Data Protocol (OData) interface.

One or more applications 135 executing on server 130 may communicate with DBMS 120 using database management interfaces such as, but not limited to, Open Database Connectivity (ODBC) and Java Database Connectivity (JDBC) interfaces. These types of applications 235 may use Structured Query Language (SQL) to manage and query data stored in database 110.

DBMS 120 serves requests to retrieve and/or modify data of database 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Application server 130 may be separated from or closely integrated with DBMS 120. A closely-integrated application server 130 may enable execution of server applications 135 completely on the database platform, without the need for an additional application server. For example, according to some embodiments, application server 130 provides a comprehensive set of embedded services which provide end-to-end support for Web-based applications. The services may include a lightweight web server, configurable support for OData, server-side JavaScript execution and access to SQL and SQLScript.

Application server 130 may provide application services (e.g., via functional libraries) using which applications 135 may manage and query the data of database 110. The application services can be used to expose the database data model, with its tables, hierarchies, views and database procedures, to clients. In addition to exposing the data model, application server 130 may host system services such as a search service.

Database 110 may store metadata regarding the structure, relationships and meaning of the data stored within database 110. This information may include data defining the schema of database tables stored within database 110. A database table schema may specify the name of the database table, columns of the database table, the data type associated with each column, and other information associated with the database table.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. The data of database 110 may be distributed among several relational databases, dimensional databases, and/or other data sources. Embodiments are not limited to any number or types of data sources.

In some embodiments, the data of database 110 may comprise one or more of conventional tabular data, row-based data, column-based data, and object-based data. Moreover, the data may be indexed and/or selectively replicated in an index to allow fast searching and retrieval thereof. Database 110 may support multi-tenancy to separately support multiple unrelated clients by providing multiple logical database systems which are programmatically isolated from one another.

Database 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each of clients 140 may comprise one or more devices executing program code of a software application for presenting user interfaces to allow interaction with application server 130. The user interfaces may comprise user interfaces suited for reporting, data analysis, and/or any other functions based on the data of database 110.

Presentation of a user interface as described herein may comprise any degree or type of rendering, depending on the type of user interface code generated by application server 130. For example, a client 140 may execute a Web Browser to request and receive a Web page (e.g., in HTML format) from application server 130 via HTTP, HTTPS, and/or WebSocket, and may render and present the Web page according to known protocols. One or more of clients 140 may also or alternatively present user interfaces by executing a standalone executable file (e.g., an .exe file) or code (e.g., a JAVA applet) within a virtual machine.

As described above, database 110 may store database tables including data for use by applications 135. FIG. 2 is a tabular representation of a portion of database table 200 for purposes of describing some embodiments. As will be evident from the following description, embodiments are not limited to the schema of table 200.

Table 200 includes thirteen columns and the illustrated portion of table 200 includes four records. The columns of each record include values related to address data. Each illustrated record has been identified as belonging to a same "group" (i.e., as evidenced by each record having the same Group_ID "1"). Each record in a group is believed to be associated with a same object. In the case of the illustrated example, each record in the group is associated with a same person, and purports to include address information associated with that person.

One group of records is illustrated in the interest of clarity. It is expected that table 200 includes more than one group of records, each of which consists of two or more records, as well as one or more single records which have not been recognized as belonging to a group (i.e., each single record is associated with an object with which no other record has been deemed to be associated).

As described above, it may be desirable to determine a "master record" of the group of records. After it is determined, the master record may be updated with the "best" values from each column of table 200, may be retained while the other records are deleted or otherwise flagged as inactive (i.e., sole survivorship), or may be treated in a different matter.

Figure 3:
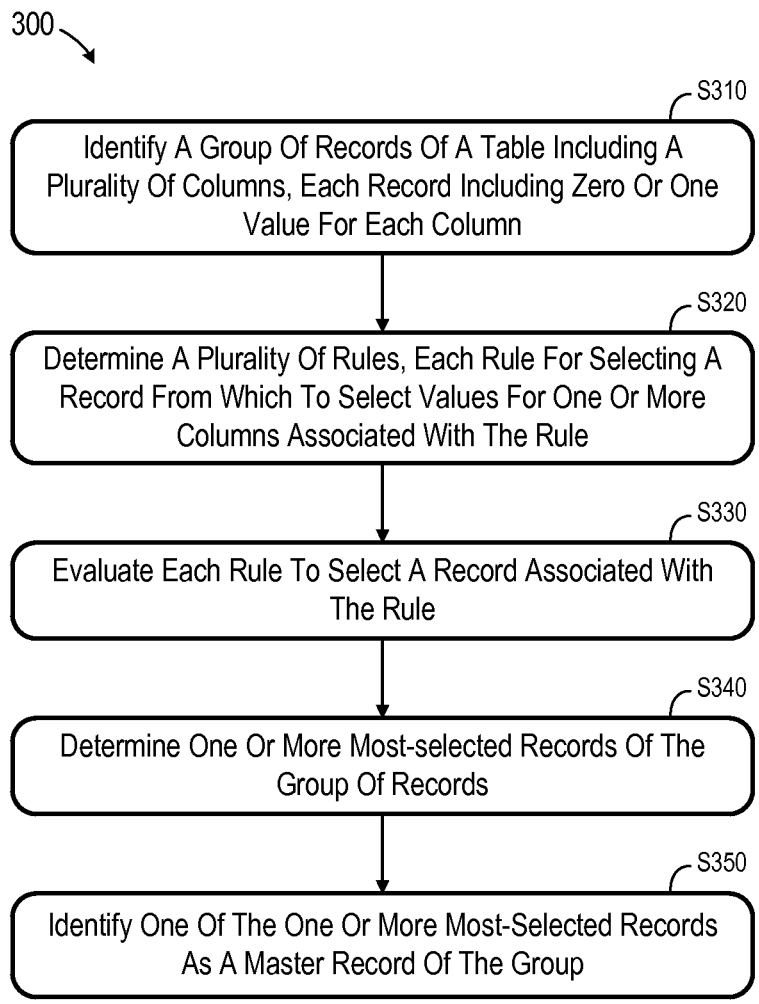
FIG. 3 is a flow diagram of a process according to some embodiments.

FIG. 3 comprises a flow diagram of process 300 according to some embodiments. Process 300 may facilitate the determination of a master record from a group of records according to some embodiments.

In some embodiments, various hardware elements of architecture 100 (e.g., one or more processors) execute program code to perform process 300. Process 300 and all other processes mentioned herein may be embodied in processor-executable program code read from one or more of non-transitory computer-readable media, such as a floppy disk, a disk-based or solid-state hard drive, CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S310, a group of records is determined Each of the records includes a plurality of columns, and each record includes zero or one value in each of its columns. According to some embodiments, the group of records is referred to as a "match" group, in the each record is believed to include data representing a same primary object. The group of records may be determined from any data source and may be identified as related prior to S310. The following example will assume that the records of table 200 of FIG. 2 are determined at S310 from database tables stored in database 110 of system 100.

A plurality of rules is determined at S320. Each rule is associated with one or more columns of table 200. Each rule may be evaluated to determine a record from which to select values for the one or more columns which are associated with the rule. For example, a rule associated with the Name column may indicate that a record associated with the longest Name value is the "best" record with respect to the Name column.

Any number of rules may be determined at S320. Also, any systems that are or become known may be used to generate the plurality of rules which are determined at S320. The rules may be generated at or prior to S320 (e.g., by a same client, another client and/or by an administrator of system 100, via appropriate interfaces provided by a suitable application 135).

The following code defines three rules, or strategies, which may be determined at S320 according to some embodiments. The first rule, STRATEGY_ADDR, is associated with columns House_Num, Street, Street_Suppl and City, the second rule, STRATEGY_ID_NUM, is associated with the column ID_Num, and the third rule, STRATEGY_DESC, is associated with the column Description. Rules may be defined in any manner according to some embodiments. Detailed explanations of each rule will follow the listing of code.

```xml
<BEST_RECORD_RULES>
  <SETTINGS>
    <DESTINATION>MASTER</DESTINATION>
      <STRATEGY_DEFINITIONS>
      <!-- Update address fields based on newest record
        or if tied then source, or if tied then first record -->
    <STRATEGY_DEFINITION>
    <NAME>STRATEGY_ADDR</NAME>
    <DATE_STRATEGY>
      <NAME>dateStg</NAME>
      <BLANKS_ALLOWED>NO</BLANKS_ALLOWED>
      <SELECT>NEWEST</SELECT>
      <ATTRIBUTE>
        <NAME>UPDATE_DATE</NAME>
      </ATTRIBUTE>
    </DATE_STRATEGY>
    <SOURCE_STRATEGY>
      <NAME>srcStg</NAME>
      <BLANKS_ALLOWED>NO</BLANKS_ALLOWED>
      <ATTRIBUTE>
        <NAME>SYSTEM</NAME>
      </ATTRIBUTE>
      <ITEMS>
        <ITEM_VALUE>ERP1</ITEM_VALUE>
        <ITEM_VALUE>ERP2</ITEM_VALUE>
        <ITEM_VALUE>ERP3</ITEM_VALUE>
      </ITEMS>
    </SOURCE_STRATEGY>
    <TIEBREAKER_STRATEGY>
      <NAME>tieDescLenStg</NAME>
    </TIEBREAKER_STRATEGY>
    </STRATEGY_DEFINITION>
    <!-- Update account number based on source system, or if tied
      then custom strategy where account number starts with 1111,
      or if tied then first record -->
    <STRATEGY_DEFINITION>
      <NAME>STRATEGY_ID_NUM</NAME>
    <SOURCE_STRATEGY>
      <NAME>srcStg</NAME>
      <BLANKS_ALLOWED>NO</BLANKS_ALLOWED>
      <ATTRIBUTE>
        <NAME>SYSTEM</NAME>
      </ATTRIBUTE>
      <ITEMS>
        <ITEM_VALUE>ERP2</ITEM_VALUE>
        <ITEM_VALUE>ERP3</ITEM_VALUE>
      </ITEMS>
    </SOURCE_STRATEGY>
      <CUSTOM_STRATEGY>
        <NAME>customStgBeginsWith</NAME>
        <BLANKS_ALLOWED>NO</BLANKS_ALLOWED>
        <FILTER>
          <ATTRIBUTE>ID_NUM</ATTRIBUTE>
          <OPERATION_TYPE>BEGINS_WITH</OPERATION_TYPE>
          <VALUE>1111<VALUE>
        </FILTER>
      </CUSTOM_STRATEGY>
      <TIEBREAKER_STRATEGY>
        <NAME>tieAcctStg</NAME>
      </TIEBREAKER_STRATEGY>
    </STRATEGY_DEFINITION>
    <!-- Update DESCRIPTION based on longest description,
      or if tied then first record -->
    <STRATEGY_DEFINITION>
      <NAME>STRATEGY_DESC</NAME>
      <LENGTH_STRATEGY>
        <NAME>lenDescStg</NAME>
        <BLANKS_ALLOWED>NO</BLANKS_ALLOWED>
        <SELECT>LONGEST</SELECT>
        <ATTRIBUTES>
          <ATTRIBUTE>
            <NAME>DESCRIPTION</NAME>
          </ATTRIBUTE>
        </ATTRIBUTES>
      </LENGTH_STRATEGY>
      <TIEBREAKER_STRATEGY>
        <NAME>tieDescLenStg</NAME>
      </TIEBREAKER_STRATEGY>
    </STRATEGY_DEFINITION>
  </STRATEGY_DEFINITIONS>
  <RULES>
```

```
    <RULE>
      <NAME>UPDATE_ADDR_BR</NAME>
<STRATEGY_DEFINITION>STRATEGY_ADDR</STRATEGY_DEFINITION>
       <ATTRIBUTES>
         <ATTRIBUTE>
           <NAME>HOUSE_NUM</NAME>
         </ATTRIBUTE>
         <ATTRIBUTE>
           <NAME>STREET</NAME>
         </ATTRIBUTE>
         <ATTRIBUTE>
           <NAME>STREET_SUPPL</NAME>
         </ATTRIBUTE>
         <ATTRIBUTE>
            <NAME>CITY</NAME>
         </ATTRIBUTE>
       </ATTRIBUTES>
      </RULE>
      <RULE>
         <NAME>UPDATE_ID_NUM</NAME>
<STRATEGY_DEFINITION>STRATEGY_ID_NUM<STRATEGY_DEFINITION>
         <ATTRIBUTES>
           <ATTRIBUTE>
             <NAME>ID_NUM<NAME>
           </ATTRIBUTE>
         </ATTRIBUTES>
      </RULE>
      <RULE>
         <NAME>UPDATE_DESC<NAME>
<STRATEGY_DEFINITION>STRATEGY_DESC</STRATEGY_DEFINITION>
         <ATTRIBUTES>
           <ATTRIBUTE>
             <NAME>DESCRIPTION</NAME>
           </ATTRIBUTE>
         </ATTRIBUTES>
       </RULE>
     </RULES>
   <SETTINGS>
  </BEST_RECORD_RULES>
```

As shown above, the rule STRATEGY_ADDR selects a newest record as a best record associated with the columns House_Num, Street, Street_Suppl and City. In the case of a tie, then the best record is select based on its source, in the following order of priority: ERP1; ERP2; ERP3. In the case of another tie, the first record is selected.

The rule STRATEGY_ID_Num selects a best record associated with the column ID_Num based on its source, in the following order of priority: ERP2; ERP3. In the case of a tie, the record having an ID_Num beginning with "1111" is selected, and, in the case of another tie, the first record is selected.

The rule STRATEGY_DESC selects a record having a longest value (i.e., in terms of number of characters) in the Description column as a best record associated with the Description column. In the case of a tie, the first record is selected.

At S330, each rule is evaluated to select a record. With reference to the first rule STRATEGY_ADDR of the present example, records 1 and 2 of table 200 each have a same Update_Date value. Therefore, the System column of each record is examined and record 2 is selected because its value "ERP1" appears in the prioritization list before the value "ERP2" of record 1.

Turning to the second rule STRATEGY_ID_NUM, records 1, 3 and 4 each include the System value ERP1 and therefore the value of the ID_Num column of each record is checked. Only record 4 includes the ID_Num value "1111" and therefore record 4 is selected by the second rule.

Next, record 4 is also selected by evaluation of the third rule STRATEGY_DESC. Only record 4 includes a value in the column Description and therefore includes the longest value.

Returning to process 300, one or more of the most-selected records are determined at S340. S340 comprises determining a record which was selected a greatest number of times during evaluation of the plurality of rules at S330. Since certain records may have been selected an equal number of times, S340 may result in determination of more than one record.

In the present Example, record 1 was selected zero times, record 2 was selected one time, record 3 was selected zero times and record 4 was selected two times. Accordingly, record 4 is determined at S340. Record 4 is therefore identified as the master record of the group of records at S350. In a case that more than one record was determined at S340, a tiebreaker is needed at S350. For example, a first record of the one or more records determined at S340 may be identified at S350 as the master record.

FIG. 4 depicts, using bold font, identification of record 4 as a master record. In some embodiments, a database schema may include a flag column in which to identify a record as a master record. FIG. 4 also illustrates best record consolidation according to some embodiments. In particular, each column of record 4 is maintained as originally shown in FIG. 2, except for those columns associated with rules which did not result in selection of record 4. In this regard, rule STRATEGY_ADDR was evaluated to select record 2 and is associated with columns House_Num, Street, Street_Suppl and City. Accordingly, the values of these columns in record 4 have been replaced by the column values of record 2, as shown in FIG. 4 using italicized font.

Figure 5:
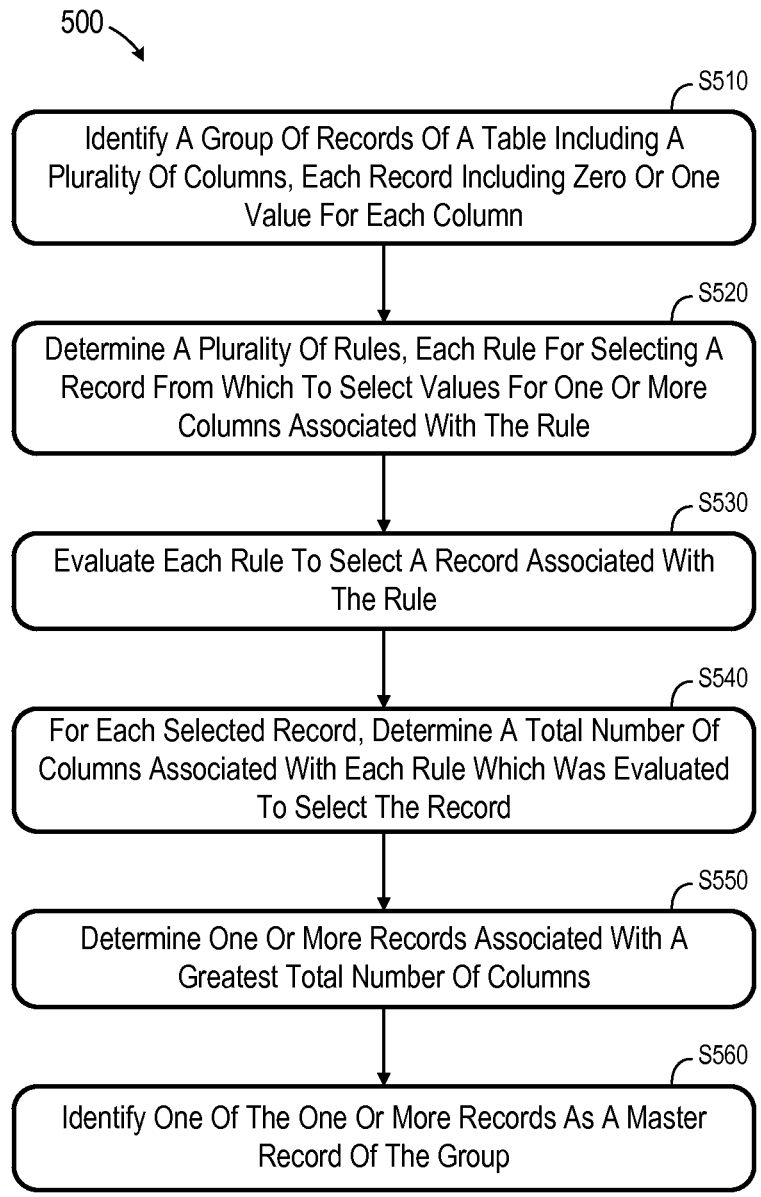
FIG. 5 is a flow diagram of a process according to some embodiments.

FIG. 5 is a flow diagram of process 500 to determine a master record according to some embodiments. S510 through S530 may proceed as described below with respect to S210 through S230 of process 200. Accordingly, after S530, a record has been selected based on each rule determined at S520.

However, at S540, a total number of columns is determined for each selected record. The total number of columns determined for a record is equal to the number of columns associated with the rules which were evaluated to select the record. An example of S540 according to some embodiments will now be presented with respect to table 200 of FIG. 2 and the above-described rules.

As described above, evaluation of rules STRATEGY_ADDR, STRATEGY_ID_NUM and STRATEGY_DESC results in selection of records 2, 4 and 4, respectively. The rules which resulted in selection of record 4 (i.e., STRATEGY_ID_NUM and STRATEGY_DESC) are associated with column ID_Num and column Description. Accordingly, the total number of columns determined at S540 for record 4 is two. In contrast, the rule which resulted in selection of record 2 (i.e., STRATEGY_ADDR) is associated with columns House_Num, Street, Street_Suppl and City. Accordingly, the total number of columns determined at S540 for record 2 is four.

One or more records associated with the greatest number of columns are identified at S550. In the present example, record 2 is identified at S550 because record 2 is associated with four columns and record 4 is associated with two columns. Records 1 and 3 were not selected by any rule and are therefore not associated with any columns.

Record 2 is therefore identified as the master record of the group of records at S560. As described with respect to S350, a tiebreaker is needed at S560 in a case that more than one record was determined to be associated with a greatest number of columns at S550. In one example of such a tiebreaker, a first record of the one or more records determined at S550 may be identified at S560 as the master record.

FIG. 6 depicts identification of record 2 as a master record. As such, each column of record 2 is maintained as originally shown in FIG. 2, except for those columns associated with rules which did not result in selection of record 2. In particular, both of rules STRATEGY_ID_NUM and STRATEGY_DESC were evaluated to select record 4 and are associated with columns ID_Num and Description, respectively. Accordingly, the values of these columns in record 2 have been replaced by the corresponding column values of record 4, as shown in FIG. 6 using italicized font.

Figure 7:
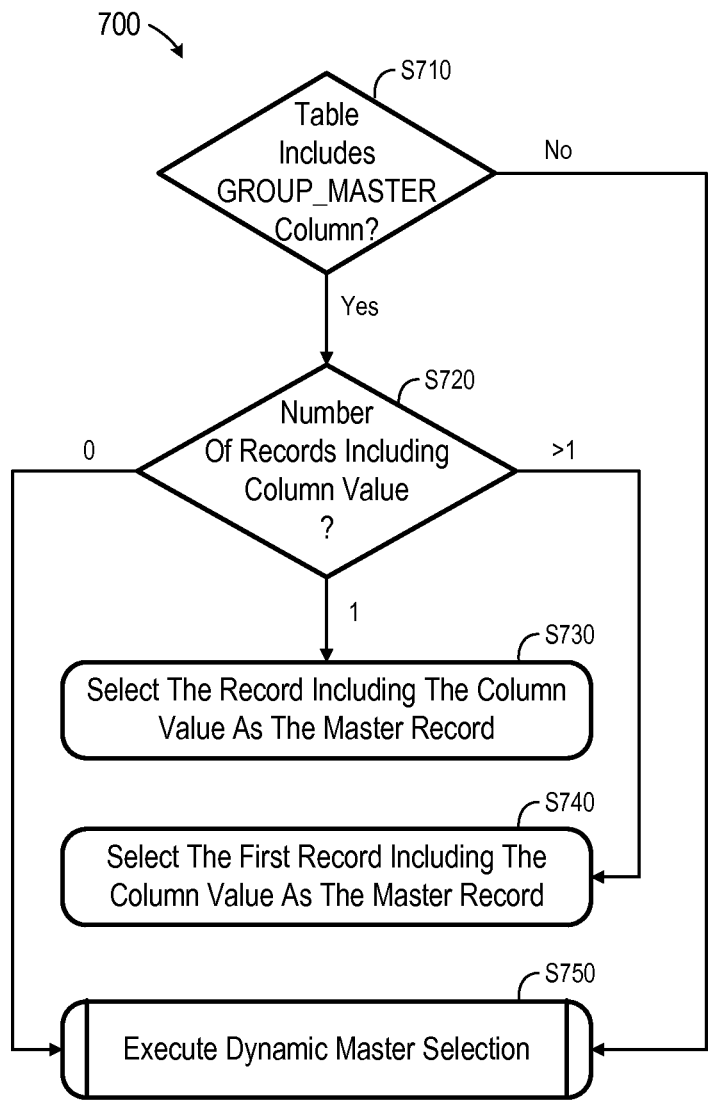
FIG. 7 is a flow diagram of a process according to some embodiments.

FIG. 7 is a flow diagram of process 700 according to some embodiments. Process 700 adds functionality to process 300 and/or 400 to cope with a scenario in which the master record of a group of table records may have been previously designated.

For example, a display device of a user/client/administrator system may present a user interface (UI) such as UI 800 of FIG. 8 according to some embodiments. UI 800 may be presented on any type of display apparatus (e.g., desktop monitor, smartphone display, tablet display) provided by any type of client device (e.g., desktop system, smartphone, tablet computer). UI 800 includes group 810, consisting of records 812, 814, 816 and 818. It is assumed that the records of group 810 have been determined (e.g., by a person and/or a computer-executed algorithm) to represent a same primary object, and that a need exists to select a master record therefrom. As shown, the user has selected checkbox 820 to designate record 814 as the master record of group 810.

Returning to process 700, it is determined at S710 whether the table including the group of records includes the column Group_Master. Such a column may comprise any column for storing a value indicating that its associated record is the master record of a group. For example, if table 200 of FIGS. 4 and 6 include such a column, the column may include a value indicating record 4 (i.e., in the case of FIG. 4) and record 2 (i.e., in the case of FIG. 6) as the master record of the group of records.

If no such column exists, flow continues to S750 to dynamically select the master record. S750 may proceed as described above with respect to process 300 and/or process 500. If the column exists, the Group_Master column of each record is evaluated at S720 to determine the number of records which include a value in the Group_Master column.

If no records include a value in the Group_Master column, flow proceeds to S750 and continues as described above. If one record includes a value in the Group_Master column, this record is selected as the master record at S730. In this regard, the selection of checkbox 820 shown in FIG. 8 may populate a Group_Master column of a corresponding record (not shown) of an underlying database table with a Boolean flag or other value, and no other records of the group include a value in this column. Flow therefore proceeds from S720 to S730 to select the corresponding record as the Master record.

FIG. 9 illustrates UI 800 after S730 according to some embodiments. As described with respect to S350 and S560, the master record may be updated with values of the best records associated with one or more columns. Specifically, the illustrated Description column of record 814 has been populated with the value of record 820.

A tiebreaker is needed if it is determined at S720 that more than one record includes a value in the Group_Master column. In some embodiments, a first record which includes such a value is selected as the master record at S740. In some embodiments, flow proceeds from S720 to S750 to dynamically select a master record in a case that it is determined at S720 that more than one record includes a value in the Group_Master column. Other systems may be used to resolve this tie and all other "ties" described herein.

Some embodiments may incorporate variations into the foregoing processes. In one example, each rule is associated with a respective weight, which is in turn assigned to each record (or column) selected by the rule during process 300 (or 500). The determination of the master record is then based on the thusly-weighted values.

Figure 10:
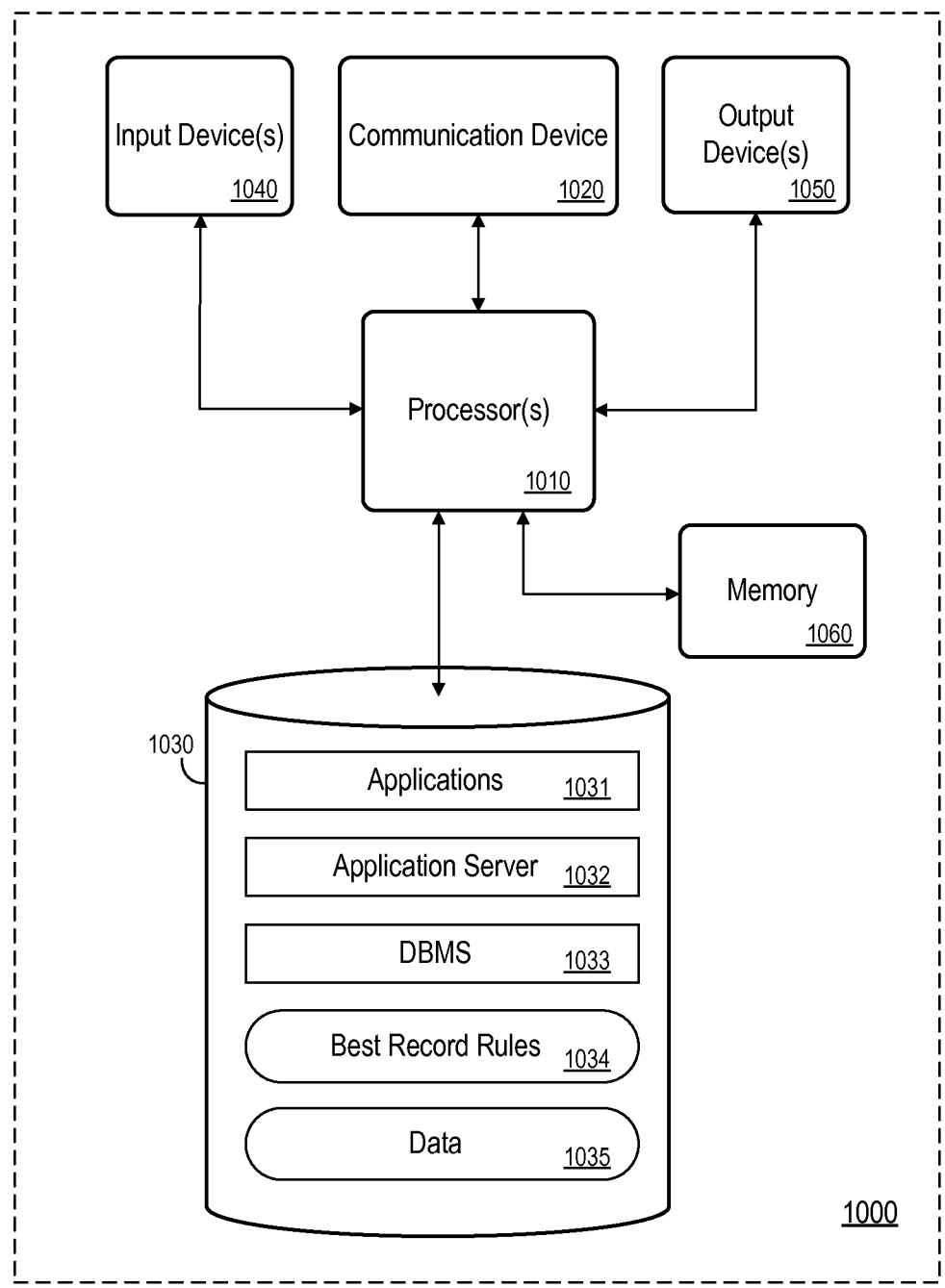
FIG. 10 is a block diagram of an apparatus according to some embodiments.

FIG. 10 is a block diagram of apparatus 1000 according to some embodiments. Apparatus 1000 may comprise a general-purpose computing apparatus and may execute program code to perform any of the functions described herein. According to some embodiments, apparatus 1000 may comprise an implementation of application server 130, DBMS 120 and database 110 of FIG. 1. Apparatus 1000 may include other unshown elements.

Apparatus 1000 includes processor 1010 operatively coupled to communication device 1020, data storage device 1030, one or more input devices 1040, one or more output devices 1050 and memory 1060. Communication device 1020 may facilitate communication with external devices, such as a client, or an external data storage device. Input device(s) 1040 may comprise, for example, a keyboard, a keypad, a mouse or other pointing device, a microphone, knob or a switch, an infra-red (IR) port, a docking station, and/or a touch screen. Input device(s) 1040 may be used, for example, to enter information into apparatus 1000. Output device(s) 1050 may comprise, for example, a display (e.g., a display screen) a speaker, and/or a printer.

Data storage device 1030 may comprise any appropriate persistent storage device, including combinations of magnetic storage devices (e.g., magnetic tape, hard disk drives and flash memory), optical storage devices, Read Only Memory (ROM) devices, etc., while memory 1060 may comprise Random Access Memory (RAM), Storage Class Memory (SCM) or any other fast-access memory.

Applications 1031, application server 1032 and DBMS 1033 may comprise program code executed by processor 1010 to cause apparatus 1000 to perform any one or more of the processes described herein. Embodiments are not limited to execution of these processes by a single apparatus.

Best record rules 1034 may include data specifying rules as described above. Rules 1034 may be used to determine a best record for a given one or more columns. Rules 1034 may be database table and/or user-specific, and one or more of rules 1034 may be associated with more than one database table and/or user. Best record rules 1034 may be received from any one or more sources and may be generated according to any system that is or becomes known. Best record rules 1034 and data 1035 (either cached or a full database) may be stored in device 1030 as shown and/or in volatile memory such as memory 1060. Data storage device 1030 may also store data and other program code for providing additional functionality and/or which are necessary for operation of apparatus 1000, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a first memory storing a database table associated with a plurality of columns and comprising a plurality of records, each of the plurality of records including zero or one value for each column;
   a second memory storing processor-executable process steps; and
   a processor to execute the processor-executable process steps to cause the system to:
      identify a match group of records of the plurality of records, the records in the match group including data potentially relating to a same object;
      determine a plurality of rules, each rule associated with one or more of the plurality of columns and defining criteria for determining a record from which to select values for the associated one or more columns;
      evaluate each of the determined plurality of rules to determine, for each rule, a best record of the match group of records based on the criteria defined by each respective rule; and
   determine a first record of the match group of records based on the best records determined for each of the determined plurality of rules, the determination of the first record of the match group of records comprises:
      determination of, for each best record of the match group of records, ef a number of rules which were evaluated to determine the best record; and
      determination of the first record as one of the best records which was determined by evaluation of a greatest number of rules.

2. A system according to claim 1, wherein the processor is further to execute the processor-executable process steps to cause the system to:
   identify the first record as a master record of the group of records.

3. A system according to claim 1,
   the first memory further storing a second database table associated with a second plurality of columns and comprising a second plurality of records, each of the second plurality of records including zero or one value for each of the second plurality of columns; and
   the processor is further to execute the processor-executable process steps to cause the system to:
   identify a second match group of records of the second plurality of records, the records in the second match group including data potentially relating to a same second object;
   determine a second plurality of rules different from the first plurality of rules, each rule of the second plurality of rules associated with one or more of the second plurality of columns and defining criteria for determining a record from which to select values for the associated one or more of the second plurality of columns;
   evaluate each of the second plurality of rules to determine, for each of the second plurality of rules, a best record of the second match group of records based on the criteria defined by each respective rule; and
   determine a first record of the second match group of records based on the best records determined for each of the determined plurality of the second plurality of rules.

4. A system according to claim 3, wherein determination of the first record of the second group of records comprises:
   determination of, for each best record of the second match group of records, a number of columns which are associated with the rules of the second plurality of rules which were evaluated to determine the best record; and determination of the first record of the second match group of records as one of the second match group of records which is associated with a greatest number of columns.

5. A system according to claim 1, wherein determination of the first record of the group of records comprises:

determination, for each best record of the match group of records, of a number of columns which are associated with the rules that were evaluated to determine the best record; and determination of the first record being based on which one of the best records that is associated with a greatest number of columns, as determined based on the evaluated rules.

6. A computer-implemented method comprising:

identifying a match group of records of a plurality of records of a database table associated with a plurality of columns, each of the plurality of records including zero or one value for each column and the records in the match group including data potentially relating to a same object;

determining a plurality of rules, each rule associated with one or more of the plurality of columns and defining criteria for determining a record from which to select values for the associated one or more columns;

evaluating each of the determined plurality of rules to determine, for each rule, a best record of the match group of records based in the criteria defined by each respective rule; and determining a first record of the match group of records based on the best records determined for each of the determined plurality of rules, the determining the first record of the match group of records comprising:

determining of, for each best record of the match group of records, a number of rules which were evaluated to determine the best record; and determining the first record as one of the best records which was determined by evaluation of a greatest number of rules.

7. A method according to claim 6, further comprising:

identifying the first record as a master record of the group of records.

8. A method according to claim 6, further comprising:

identifying a second match group of records of a second plurality of records of a second database table associated with a second plurality of columns, each of the second plurality of records including zero or one value for each of the second plurality of columns, the records in the second match group including data potentially relating to a same second object;

determining a second plurality of rules different from the first plurality of rules, each rule of the second plurality of rules associated with one or more of the second plurality of columns and determining criteria for determining a record from which to select values for the associated one or more of the second plurality of columns;

evaluating each of the second plurality of rules to determine, for each of the second plurality of rules, a best record of the second group of records based on the criteria defined by each respective rule; and determining a first record of the second match group of records based on the best records determined for each of the determined plurality of the second plurality of rules.

9. A method according to claim 8, wherein determining the first record of the second group of records comprises:

determining of, for each best record of the second match group of records, a number of columns which are associated with the rules of the second plurality of rules which were evaluated to determine the best record; and determining the first record of the second match group of records as one of the second match group of records which is associated with a greatest number of columns.

10. A method according to claim 6, wherein determining the first record of the group of records comprises:

determining, for each best record of the match group of records, a number of columns which are associated with the rules that were evaluated to determine the best record; and determining the first record being based on which as one of the best records that is associated with a greatest number of columns, as determined based on the evaluated rules.

11. A non-transitory computer-readable medium storing program code, the program code executable by a computer system to cause the computer system to:

identify a match group of records of a plurality of records of a database table associated with a plurality of columns, each of the plurality of records including zero or one value for each column and the records in the match group including data potentially relating to a same object;

determine a plurality of rules, each rule associated with one or more of the plurality of columns and defining criteria for determining a record from which to select values for the associated one or more columns;

evaluate each of the determined plurality of rules to determine, for each rule, a best record of the match group of records based on the criteria defined by the respective rule; and determine a first record of the match group of records based on the best records determined for each of the determined plurality of rules, the determination of the first record of the match group of records comprising:

determination of, for each best record of the match group of records, of a number of rules which were evaluated to determine the best record; and determination of the first record as one of the best records which was determined by evaluation of a greatest number of rules.

12. A medium according to claim 11, the program code executable by the computer system to cause the computer system to:

identify the first record as a master record of the group of records.

13. A medium according to claim 11, the program code executable by the computer system to cause the computer system to:

identify a second match group of records of a second plurality of records of a second database table associated with a second plurality of columns, each of the second plurality of records including zero or one value for each of the second plurality of columns, the records in the second match group including data potentially relating to a same second object;

determine a second plurality of rules different from the first plurality of rules, each rule of the second plurality of rules associated with one or more of the second plurality of columns and determining criteria for determining a record from which to select values for the associated one or more of the second plurality of columns;

evaluate each of the second plurality of rules to determine, for each of the second plurality of rules, a best record of the second match group of records based on the criteria defined by each respective rule; and determine a first record of the second match group of records based on the best records determined for each of the determined plurality of the second plurality of rules.

14. A medium according to claim 13, wherein determination of the first record of the second group of records comprises:

determination of, for each best record of the second match group of records, a number of columns which are associated with the rules of the second plurality of rules which were evaluated to determine the best record; and determination of the first record of the second match group of records as one of the second match group of records which is associated with a greatest number of columns.

15. A medium according to claim 11, wherein determination of the first record of the group of records comprises:

determination of, for each best record of the match group of records, a number of columns which are associated with the rules that were evaluated to determine the best record; and determination of the first record being based om which as one of the best records that is associated with a greatest number of columns, as determined based on the evaluated rules.

* * * * *